(12) United States Patent
Benke

(10) Patent No.: US 7,239,490 B2
(45) Date of Patent: Jul. 3, 2007

(54) MEDIUM VOLTAGE VACUUM CIRCUIT INTERRUPTER

(75) Inventor: James J. Benke, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 498 days.

(21) Appl. No.: 10/668,074

(22) Filed: Sep. 22, 2003

(65) Prior Publication Data

US 2005/0063107 A1    Mar. 24, 2005

(51) Int. Cl.
*H02H 3/00* (2006.01)
*H01H 33/60* (2006.01)

(52) U.S. Cl. ............................ 361/2; 361/5; 218/118
(58) Field of Classification Search ............. 361/2–7; 218/118, 134
See application file for complete search history.

(56) References Cited

U.S. PATENT DOCUMENTS

| | | | | |
|---|---|---|---|---|
| 3,471,669 A | * | 10/1969 | Curtis | 200/302.1 |
| 3,597,713 A | * | 8/1971 | McClain et al. | 335/171 |
| 3,812,314 A | | 5/1974 | Nonken | |
| 3,925,722 A | * | 12/1975 | Fohrhaltz et al. | 324/415 |
| 3,956,721 A | * | 5/1976 | Link | 335/6 |
| 4,059,816 A | | 11/1977 | Bonecutter et al. | |
| 4,077,026 A | | 2/1978 | Slade et al. | |
| 4,527,028 A | * | 7/1985 | Luehring | 218/119 |
| 5,321,378 A | | 6/1994 | Ferullo et al. | |
| 5,628,394 A | | 5/1997 | Benke et al. | |
| 5,808,258 A | | 9/1998 | Luzzi | |
| 6,331,687 B1 | * | 12/2001 | Dunk et al. | 218/140 |
| 6,362,445 B1 | | 3/2002 | Marchand et al. | |
| 6,373,015 B1 | | 4/2002 | Marchand et al. | |
| 6,444,939 B1 | | 9/2002 | Crookston et al. | |
| 6,541,727 B2 | * | 4/2003 | Beck et al. | 218/140 |

FOREIGN PATENT DOCUMENTS

| | | |
|---|---|---|
| DE | 195 02 063 A1 | 7/1996 |
| EP | 0 471 678 B1 | 2/1992 |
| EP | 0 796 502 B1 | 9/1997 |
| EP | 0 803 141 B1 | 10/1997 |
| WO | WO 99/45617 | 9/1999 |

\* cited by examiner

*Primary Examiner*—Brian Sircus
*Assistant Examiner*—Danny Nguyen
(74) *Attorney, Agent, or Firm*—Michael J. Moran

(57) ABSTRACT

An encapsulated medium voltage vacuum circuit interrupter includes a line terminal, a load terminal, a vacuum interrupter, an operating mechanism and an elongated, insulated, generally cylindrical encapsulating housing. The vacuum interrupter includes a vacuum envelope containing a fixed contact assembly and a movable contact assembly movable between a closed circuit position in electrical communication with the fixed contact assembly and an open circuit position spaced apart from the fixed contact assembly. The fixed contact assembly is electrically interconnected with the line terminal. A flexible conductor electrically connects the movable contact assembly with the load terminal. The operating mechanism moves the movable contact assembly between the closed circuit position and the open circuit position. The housing includes a first end supporting the line terminal and an opposite second end supporting the load terminal. The housing encloses the vacuum interrupter, the flexible conductor and the operating mechanism.

6 Claims, 9 Drawing Sheets

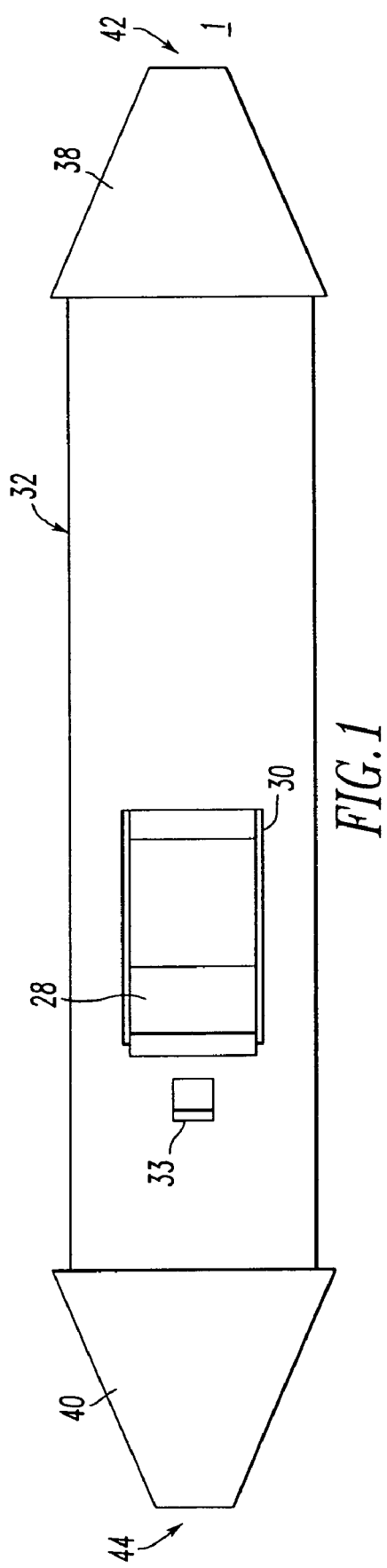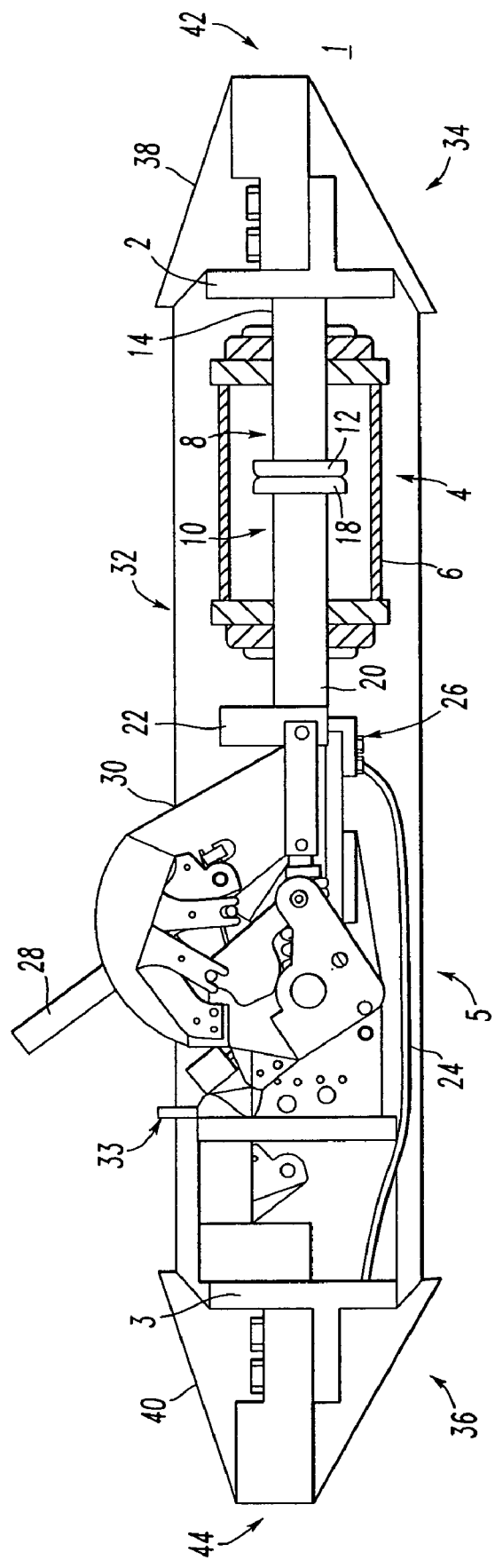

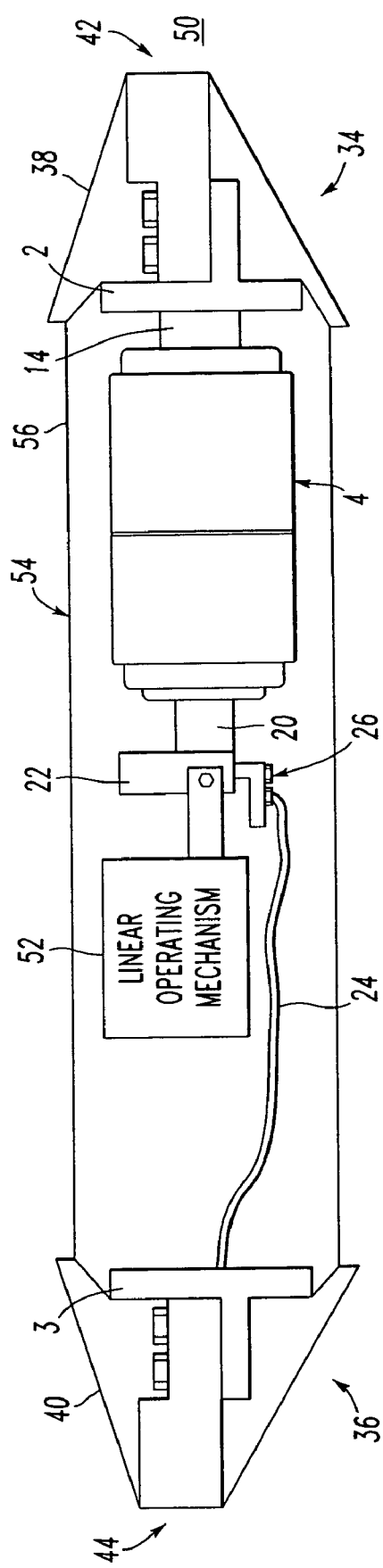
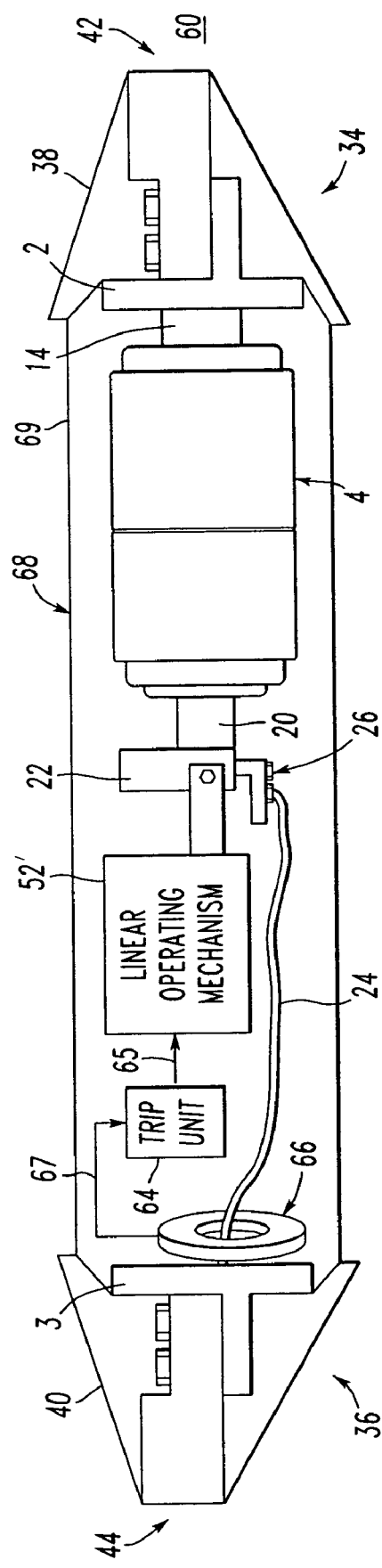
FIG.3
FIG.4

MEDIUM VOLTAGE VACUUM CIRCUIT INTERRUPTER

BACKGROUND OF THE INVENTION

1. Field of the Invention

This invention relates to circuit interrupters and, more particularly, to medium voltage vacuum circuit breakers.

2. Background Information

Circuit interrupters, such as circuit breakers, provide protection for electrical systems from electrical fault conditions such as, for example, current overloads, short circuits and abnormal voltage conditions. Typically, circuit breakers include a spring powered operating mechanism, which opens electrical contacts to interrupt the current through the conductors of the electrical system in response to abnormal conditions.

Vacuum circuit breakers employ separable main contacts disposed within an insulating housing. Generally, one of the contacts is fixed relative to both the housing and to an external electrical conductor, which is interconnected with the protected circuit. The other contact is movable. The movable contact assembly usually comprises a stem of circular cross-section. At one end, the movable contact is enclosed within a vacuum chamber and, at the other end, a driving mechanism is external to the vacuum chamber. An operating rod assembly comprising a push rod, which is fastened to the end of the stem opposite the movable contact, and the driving mechanism provide the motive force to move the movable contact into or out of engagement with the fixed contact. The operating rod assembly is operatively connected to a latchable operating mechanism, which is responsive to an abnormal current condition. When an abnormal condition is reached, the latchable operating mechanism becomes unlatched, which causes the push rod to move to the open position.

Vacuum circuit interrupters are typically used, for instance, to reliably interrupt medium voltage AC currents and, also, high voltage AC currents of several thousands of amperes or more.

Medium voltage circuit interrupters operate at voltages of from about 1 to 38 kV. Such circuit interrupters, being relatively large and heavy, are mounted on trucks for insertion into and removal from metal enclosures or cabinets in which they are housed. As the circuit interrupter rolls fully into position within the enclosure, contact fingers engage stabs, which connect the circuit interrupter to line and load conductors. Withdrawal of the truck disconnects the circuit interrupter from all conductors, thereby assuring a safe condition for maintenance or removal.

Medium voltage circuit interrupters employing vacuum interrupters typically have a front low voltage portion just to the rear of a front panel, which typically includes the breaker controls. The low voltage portion is electrically insulated, through the use of standoffs, from high voltage portions, which include the vacuum interrupters. The standoffs permit sufficient spacing of the conducting components in order that air within the housing can be an effective insulator to isolate the low voltage portions from the high voltage portions. However, this spacing also contributes to the size of the units.

More recently, attempts have been made to reduce the size of these units by hermetically sealing them and filling them with a gaseous insulator having a higher dielectric capacity than air.

Interruption of a medium/high voltage circuit advantageously requires a current interruption device that rapidly brings the current to zero upon the occurrence of a line fault. A "high" voltage fuse is of a type employed in electrical power distribution circuits typically carrying voltages of about 1 to 38 kV. Line faults at these high energy levels can cause extensive damage to circuit components and devices connected to the circuit, or to conductors and various other portions of the electrical energy distribution system. To minimize potential damage, fuses are employed with the intent to interrupt current flow quickly, following the onset of fault conditions involving high current loading, such as a short circuit or overload faults.

There is room for improvement in medium voltage vacuum circuit interrupters.

SUMMARY OF THE INVENTION

These needs and others are met by the present invention, which provides a medium voltage circuit interrupter in which an elongated housing, such as an elongated cylindrical housing, includes a first end supporting a first terminal, such as a line terminal, and an opposite second end supporting a second terminal, such as a load terminal. The elongated housing encloses a vacuum switch, a flexible conductor and an operating mechanism.

As one aspect of the invention, a medium voltage vacuum circuit interrupter comprises: a first terminal; a second terminal; a vacuum switch comprising a vacuum envelope containing a fixed contact assembly and a movable contact assembly movable between a closed circuit position in electrical communication with the fixed contact assembly and an open circuit position spaced apart from the fixed contact assembly, the fixed contact assembly electrically interconnected with the first terminal; a flexible conductor electrically connecting the movable contact assembly with the second terminal; an operating mechanism moving the movable contact assembly between the closed circuit position and the open circuit position; and an elongated housing including a first end supporting the first terminal and an opposite second end supporting the second terminal, the housing enclosing the vacuum switch, the flexible conductor and the operating mechanism.

The operating mechanism may include a current sensor sensing current passing between the movable contact assembly and the second terminal, and a trip unit responsive to the sensed current to move the movable contact assembly from the closed circuit position to the open circuit position.

Each of the first and second terminals may include a termination structured to electrically connect to a line power cable or a load power cable, or a connector structured to electrically connect to a line power bus or a load power bus.

The elongated housing may be generally tubular shaped including a first opening at the first end and a second opening at the second end. The first and second terminals may include a first member, which is supported by the generally tubular shaped elongated housing at one of the first and second openings thereof, and a second member, which is normal to the first member.

The elongated housing may include an elongated insulated cylindrical portion housing the vacuum switch, the flexible conductor and the operating mechanism, and also may include two conical insulated end portions covering the first and second terminals.

The elongated housing may include first and second openings, and the first and second terminals may protrude through the first and second openings, respectively, of the elongated housing.

The elongated housing may have an opening, and the operating mechanism may be a single-step operating mechanism including an operating handle, which protrudes through the opening of the housing.

As another aspect of the invention, a multi-pole medium voltage vacuum circuit interrupter comprises: a plurality of circuit interrupter poles, each of the circuit interrupter poles comprising: a first terminal; a second terminal; a vacuum switch comprising a vacuum envelope containing a fixed contact assembly and a movable contact assembly movable between a closed circuit position in electrical communication with the fixed contact assembly and an open circuit position spaced apart from the fixed contact assembly, the fixed contact assembly electrically interconnected with the first terminal; a flexible conductor electrically connecting the movable contact assembly with the second terminal; an operating mechanism moving the movable contact assembly between the closed circuit position and the open circuit position; an elongated housing including a first end supporting the first terminal and an opposite second end supporting the second terminal, the housing enclosing the vacuum switch, the flexible conductor and the operating mechanism; and means for linking the operating mechanism to another operating mechanism of another one of the circuit interrupter poles.

The operating mechanism may include a trip unit. The means for linking may include an electrical cable connecting the trip unit to another trip unit of another one of the circuit interrupter poles, or an infrared transceiver connecting the trip unit to another trip unit of another one of the circuit interrupter poles.

The operating mechanism may include an operating handle, which protrudes through an opening of the housing. The means for linking may include a mechanical linkage connecting the operating handle to another operating handle of another one of the circuit interrupter poles.

The elongated housing may have a generally cylindrical shape. The elongated housing of one of the circuit interrupter poles may include a first support member proximate the first end of the elongated housing and a second support member proximate the opposite second end of the elongated housing, with each of the first and second support members including a first cutout to hold the generally cylindrical shape of the one of the circuit interrupter poles proximate one of the first and second ends of the elongated housing, and with each of the first and second support members further including at least one second cutout to hold the generally cylindrical shape of at least another one of the circuit interrupter poles proximate one of the first and second ends of the elongated housing.

BRIEF DESCRIPTION OF THE DRAWINGS

A full understanding of the invention can be gained from the following description of the preferred embodiments when read in conjunction with the accompanying drawings in which:

FIG. 1 is a plan view of a medium voltage vacuum circuit interrupter in accordance with the present invention.

FIG. 2 is an elevation view of the medium voltage vacuum circuit interrupter of FIG. 1 with some parts cut away to show internal structures.

FIG. 3 is a block diagram of a medium voltage vacuum circuit interrupter in accordance with another embodiment of the invention.

FIG. 4 is a block diagram of a medium voltage vacuum circuit breaker including a trip unit in accordance with another embodiment of the invention.

DESCRIPTION OF THE PREFERRED EMBODIMENTS

As employed herein, the term "vacuum switch" expressly includes, but is not limited to, a "vacuum interrupter" and/or a "vacuum envelope".

Figure 11:
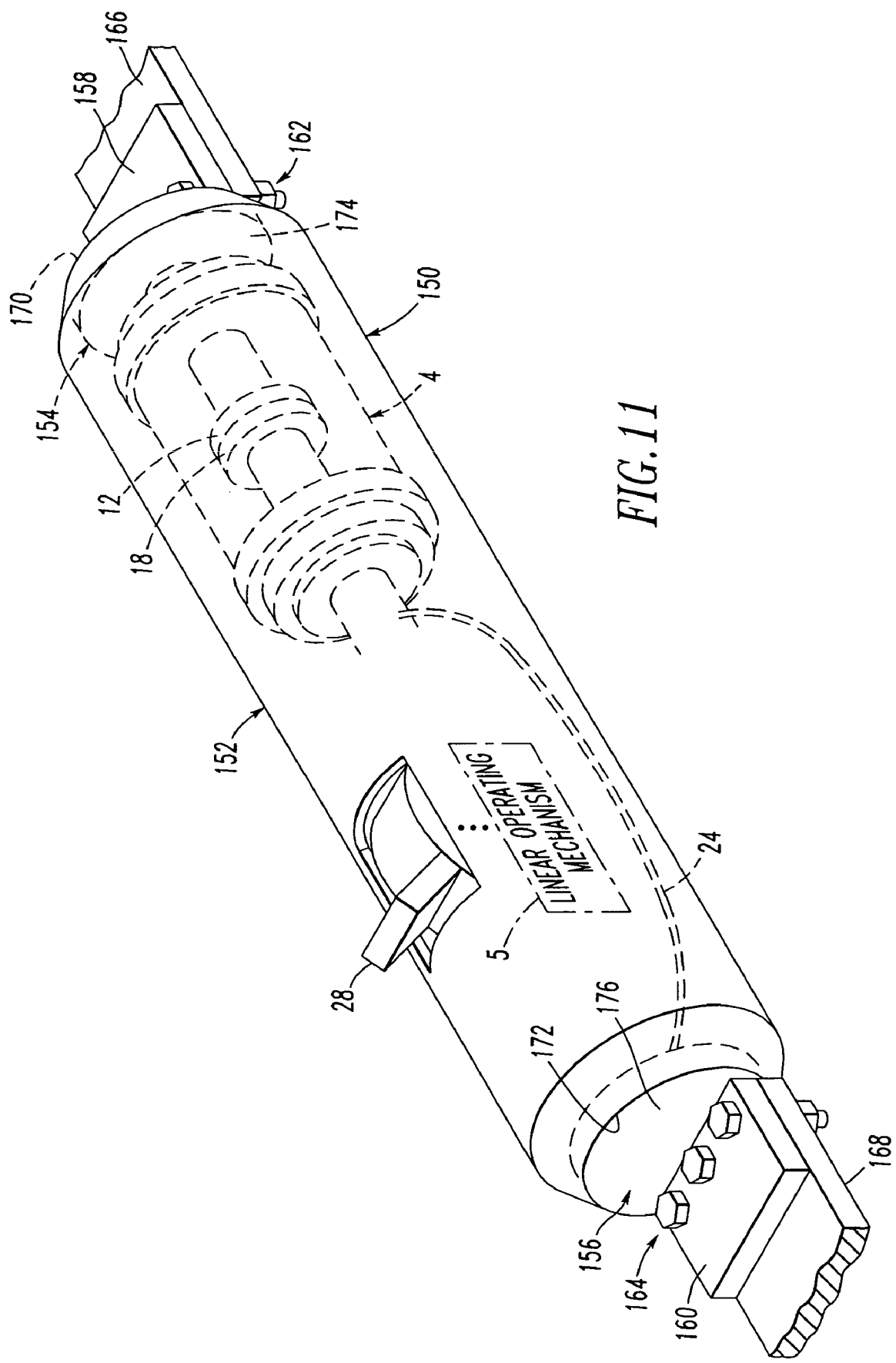
FIG. 11 is a cross-sectional view of a medium voltage vacuum circuit interrupter employing flat pad mounting to line and load power busses.

Referring to FIGS. 1 and 2, a medium voltage vacuum circuit interrupter 1 includes a first or line terminal 2, a second or load terminal 3, a vacuum interrupter or switch 4, and an operating mechanism 5. The vacuum switch 4 is a conventional vacuum interrupter (VI) (e.g., without limitation, a 3" VI bottle made by Eaton ICutler-Hammer of Horseheads, N.Y. As is well known, the vacuum interrupter 4 includes a vacuum envelope or sealed vacuum chamber (e.g., vacuum bottle 6) containing a fixed contact assembly 8 and a movable contact assembly 10 movable along a longitudinal axis between a closed circuit position (as shown in FIG. 11) in electrical communication with the fixed contact assembly 8 and an open circuit position (as shown in FIG. 2) spaced apart from the fixed contact assembly 8.

The fixed contact assembly 8 includes a fixed contact 12 sealed within the vacuum bottle 6 and an electrical conductor 14 connected to the fixed contact at one end thereof. The electrical conductor 14 sealably penetrates the vacuum bottle 6 and terminates at the line terminal 2 at the other end of the fixed contact assembly 8. The movable contact assembly 10 includes a movable contact 18 sealed within the vacuum bottle 6 and movable between a first position (not shown in FIG. 2), in electrical communication with the fixed contact 12, and a second position (as shown in FIG. 2), out of electrical communication with the fixed contact 12. The movable contact assembly 10 further includes a movable electrical stem 20 connected to the movable contact 18 at one end thereof. The movable electrical stem 20 sealably penetrates the vacuum bottle 6 and terminates at a member 22 at the other end of the movable contact assembly 10.

A flexible conductor 24 (e.g., a braided conductor; a laminated conductor) electrically connects the movable contact assembly 10 and the movable electrical stem 20 at a lower portion 26 of the member 22 with the second or load terminal 3. The operating mechanism 5, which in the exemplary embodiment is a one-step, manual mechanism, moves the movable contact assembly 10 in a linear or longitudinal direction between the closed circuit position (not shown in FIG. 2) and the open circuit position (as shown in FIG. 2). The operating mechanism 5 includes an operating handle 28 (shown in the closed position in FIG. 2), which protrudes through an opening 30 of a housing 32.

Preferably, the operating mechanism 5 further includes an erosion indicator 33, which monitors contact wear inside the vacuum bottle 6 of the hermetically sealed vacuum interrupter 4. Since the contacts 12,18 cannot be seen, the most reliable method of gaging their condition is by measurement of the change in the extension of the end of the movable electrical stem 20. Erosion of vacuum interrupter contacts, such as contacts 12,18, over time can occur due to burning off of surface material within the vacuum interrupter 4. The indicator 33 visually shows the condition of such contacts.

In accordance with an important aspect of the present invention, the housing 32 may be an elongated, generally cylindrical housing, which is preferably encapsulated by or made of a suitable insulator (e.g., molded rubber; epoxy). The housing 32 encloses the vacuum switch 4, the flexible conductor 24 and the operating mechanism 5. The housing 32 includes a first end 34 supporting the first or line terminal 2 and an opposite second end 36 supporting the second or load terminal 3. As shown in FIG. 2, the housing 32 includes two insulated conical end covers 38 and 40, which define a cable in location 42 and a cable out location 44, respectively.

Referring to FIG. 3, another medium voltage vacuum circuit interrupter 50 is shown. The circuit interrupter 50 is similar to the circuit interrupter 1 of FIGS. 1 and 2, except that the operating mechanism 5 is replaced by a suitable linear operating mechanism 52 and the housing 32 is replaced by an elongated, generally cylindrical housing 54 having a cylindrical center portion 56 and the two conical end covers 38,40 of FIGS. 1 and 2. The entire housing 54 is also preferably encapsulated by or made of a suitable insulator (e.g., molded rubber; epoxy). Although not shown, the linear operating mechanism 52 may or may not include a manual charging mechanism (not shown), an operating handle (e.g., handle 28 of FIG. 2) and/or a trip mechanism (e.g., trip unit 64 of FIG. 4). For example, a manual charging mechanism may be employed as an economical way to charge the breaker springs (not shown) of the linear operating mechanism 52. Alternative configurations include: (1) manual mechanical operation with an internal trip system (i.e., a one-step operating mechanism 52' with a trip unit 64 as discussed below in connection with FIG. 4); (2) manual mechanical operation with an internal trip system and wireless communication capabilities (i.e., a one-step operating mechanism 52' with a trip unit 64' as discussed below in connection with FIG. 5); and (3) manual mechanical operation with an internal trip system and electrical communication capabilities (i.e., a one-step operating mechanism with a trip unit 108 as discussed below in connection with FIG. 8).

Although not otherwise disclosed herein, the invention is also applicable to motor operated operation (e.g., an integral one-step linear operating mechanism with a motor) with an internal trip system and/or wireless communication capabilities, and/or motor operated operation (e.g., an integral two-step linear operating mechanism with a motor) with an internal trip system and/or wireless communication capabilities.

FIG. 4 shows another medium voltage vacuum circuit interrupter 60. The circuit interrupter 60 is similar to the circuit interrupter 50 of FIG. 3, except that a linear one-step operating mechanism 52' includes a trip unit 64 having a latch member 65 and a current sensor 66 (e.g., any suitable current sensor; a Rogowski coil) having a sensed current output 67. The trip unit 64 is preferably powered from current flowing through the current sensor 66. An elongated, generally cylindrical housing 68 includes a cylindrical portion 69 and the two conical end covers 38,40 of FIGS. 1 and 2. The housing 68 is also preferably encapsulated by or made of a suitable insulator (e.g., molded rubber; epoxy). Although not shown, the linear one-step operating mechanism 52' may or may not include a manual charging mechanism and/or an operating handle.

The current sensor 66 senses current passing through the flexible conductor 24 between the first or line terminal 2, which, when the contacts 12,18 of FIG. 2 are closed, is electrically connected to the movable electrical stem 20, and, thus, the second or load terminal 3. Under predetermined fault current conditions, the trip unit 64 responds to the sensed current output 67 of the current sensor 66 to move the latch member 65 and cause the linear one-step operating mechanism 52' to move the movable electrical stem 20 (left with respect to FIG. 4) and, thus, move the movable contact assembly 10 of FIG. 2, from the closed circuit position to the open circuit position.

Figure 5:
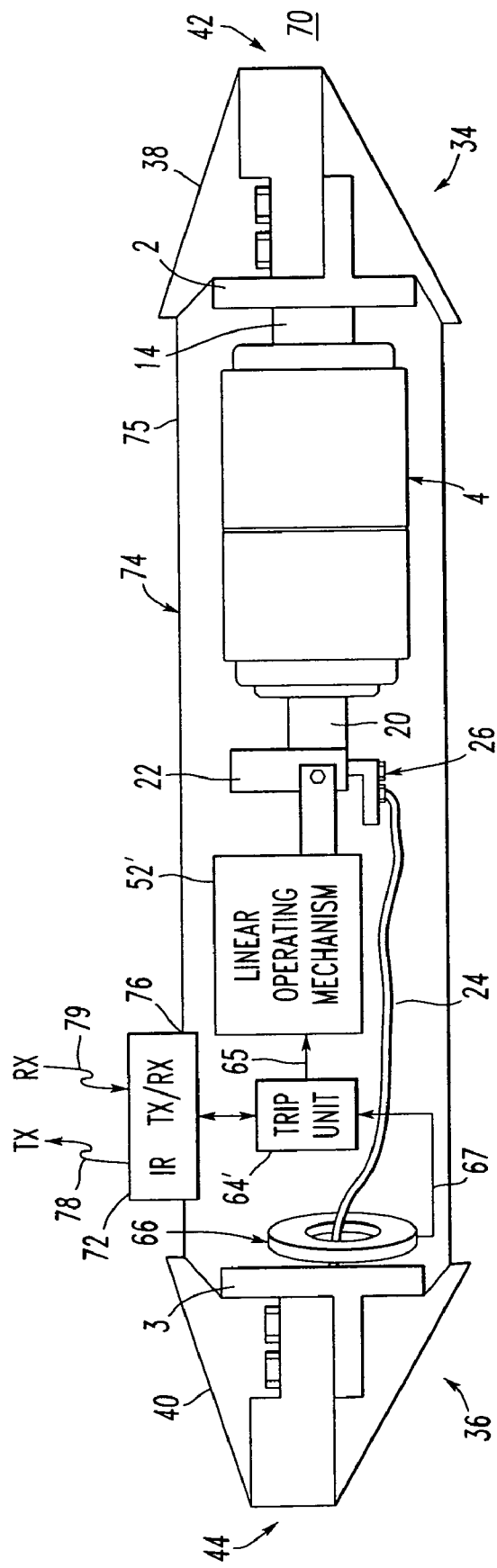
FIG. 5 is a block diagram of a medium voltage vacuum circuit breaker including a trip unit and a wireless communication port in accordance with another embodiment of the invention.

Referring to FIG. 5, another medium voltage vacuum circuit interrupter 70 is shown. The circuit interrupter 70 is similar to the circuit interrupter 60 of FIG. 4, except that a trip unit 64' includes a wireless (e.g., infrared) communication port 72. An elongated, generally cylindrical housing 74 includes the two conical end covers 38,40 of FIGS. 1 and 2 and a cylindrical portion 75 with an opening 76, through which protrudes a portion of the communication port 72. The housing 74 is also preferably encapsulated by or made of a suitable insulator (e.g., molded rubber; epoxy). The communication port 72 includes a transmit signal 78 (TX) and a receive signal 79 (RX). For example, the transmit signal 78 (TX) may output the tripped open state of the trip unit 64', linear operating mechanism 52' and vacuum switch 4, and the receive signal 79 (RX) may input an external trip signal to the trip unit 64'. As discussed below in connection with FIG. 7, this communication method allows for one pole (e.g., A) to trip open, open and/or close all three poles (e.g., A, B ,C) through the use of the wireless signals 78,79.

Figure 6:
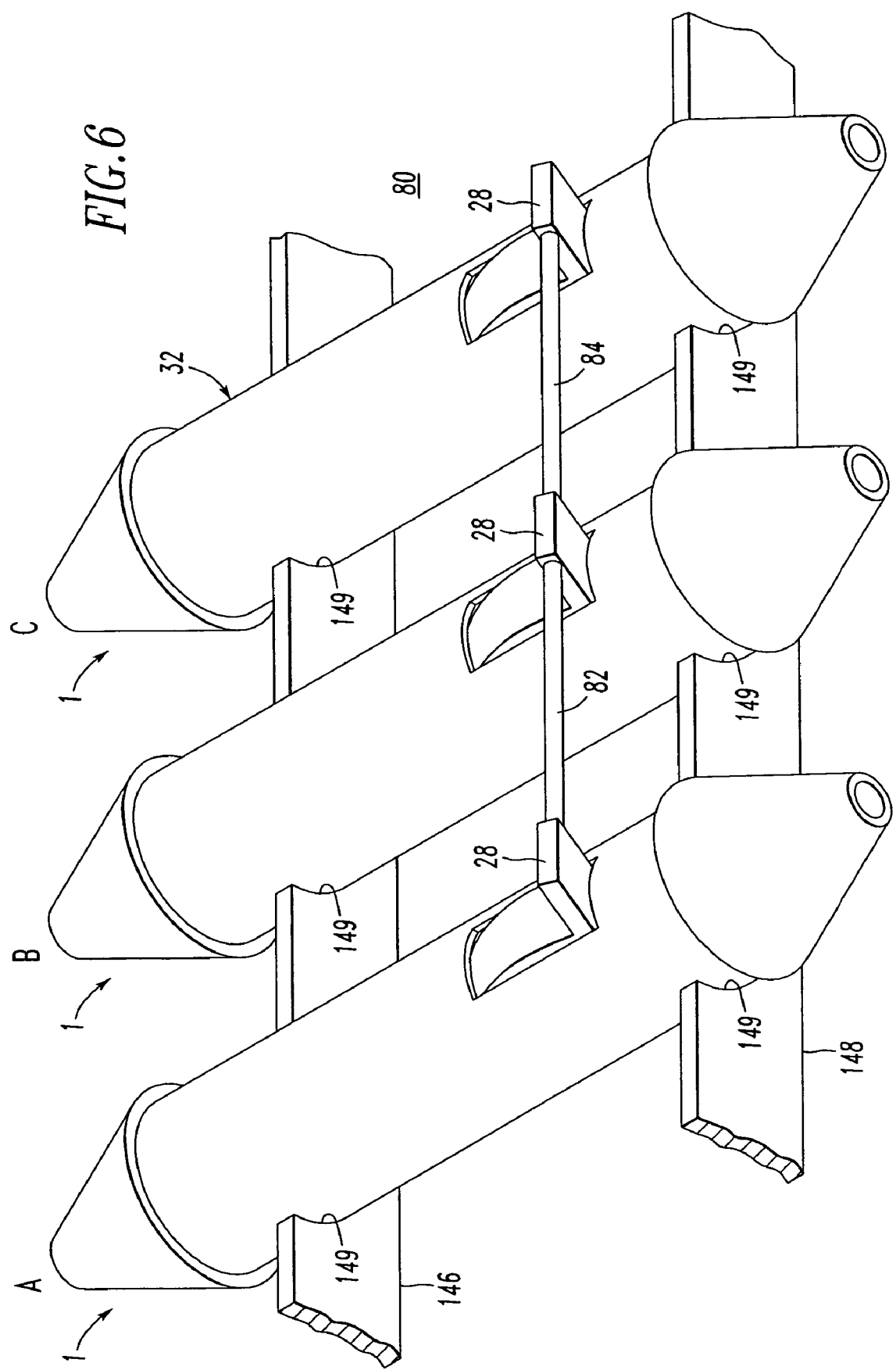
FIG. 6 is an isometric view of a three-pole medium voltage vacuum circuit interrupter formed from three of the medium voltage vacuum circuit interrupters of FIG. 1, with the three poles mechanically linked in order to open, close and/or trip as one unit.

Referring to FIG. 6, a three-pole medium voltage vacuum circuit interrupter 80 is shown. The three-pole circuit interrupter 80 is formed from three of the medium voltage vacuum circuit interrupters 1 of FIG. 1. The three poles A, B, C formed by the individual circuit interrupters 1 are mechanically ganged or linked, in order to open, close and/or trip as one unit. In this example, there is a suitable first mechanical linkage 82 connecting the operating handles 28 of the adjacent poles A and B, and a suitable second mechanical linkage 84 connecting the operating handles 28 of the adjacent poles B and C.

Figure 7:
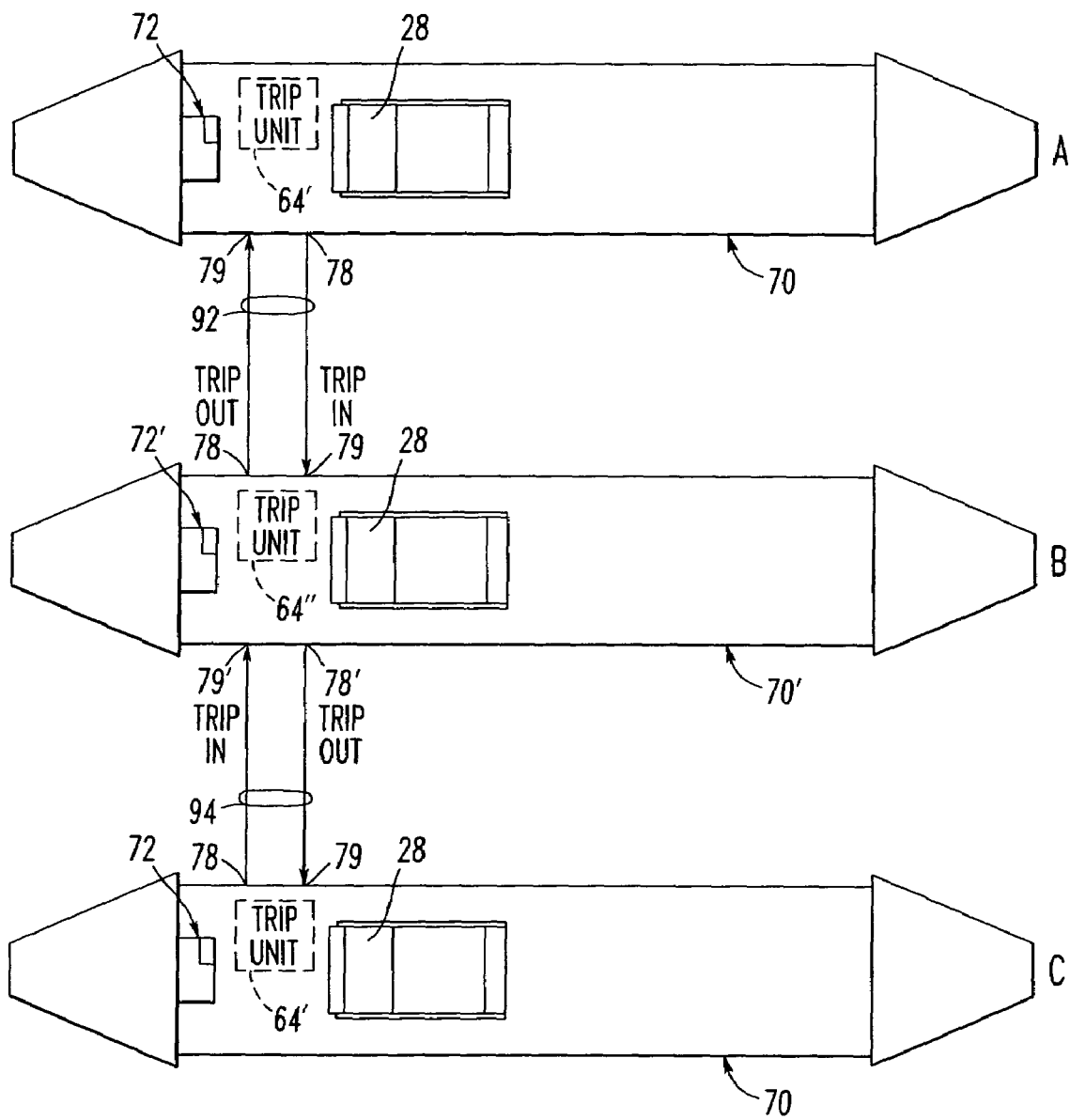
FIG. 7 is a block diagram of a three-pole medium voltage vacuum circuit interrupter formed from three of the medium voltage vacuum circuit interrupters of FIG. 5, with the three poles wirelessly linked in order to open, close and/or trip as one unit.

FIG. 7 shows another three-pole medium voltage vacuum circuit interrupter 90, which is formed from two of the single-pole medium voltage vacuum circuit interrupters 70 (poles A and C) of FIG. 5 and another single-pole medium voltage vacuum circuit interrupter 70' (pole B). The circuit interrupter 70' is similar to the circuit interrupter 70 of FIG.

5 except that an internal trip unit 64" is employed instead of the trip unit 64' of FIG. 5. The trip unit 64" includes a communication port 72' having two transmit signals 78,78' and two receive signals 79,79'. For example, the transmit signals 78,78' output the tripped open state of the trip unit 64", and the receive signals 79,79' input external trip signals to the trip unit 64". In this example, the two transmit signals 78,78' of the circuit interrupter 70' communicate the tripped open state of that circuit interrupter to the receive signals 79 of the circuit interrupters 70 (poles A and C), while the two receive signals 79,79' (pole B) input the tripped open state of the transmit signals 78 from the circuit interrupters 70 (poles A and C).

In this manner, the three poles A,B,C formed by the three individual circuit interrupters 70,70',70 are electrically ganged or linked, in order to open, close and/or trip as one unit. In this example, there is a suitable first wireless linkage 92, such as two infrared signals, connecting the trip units 64' and 64" of the respective adjacent poles A and B, and a suitable second wireless linkage 94 connecting the trip units 64" and 64' of the respective adjacent poles B and C.

Figure 8:
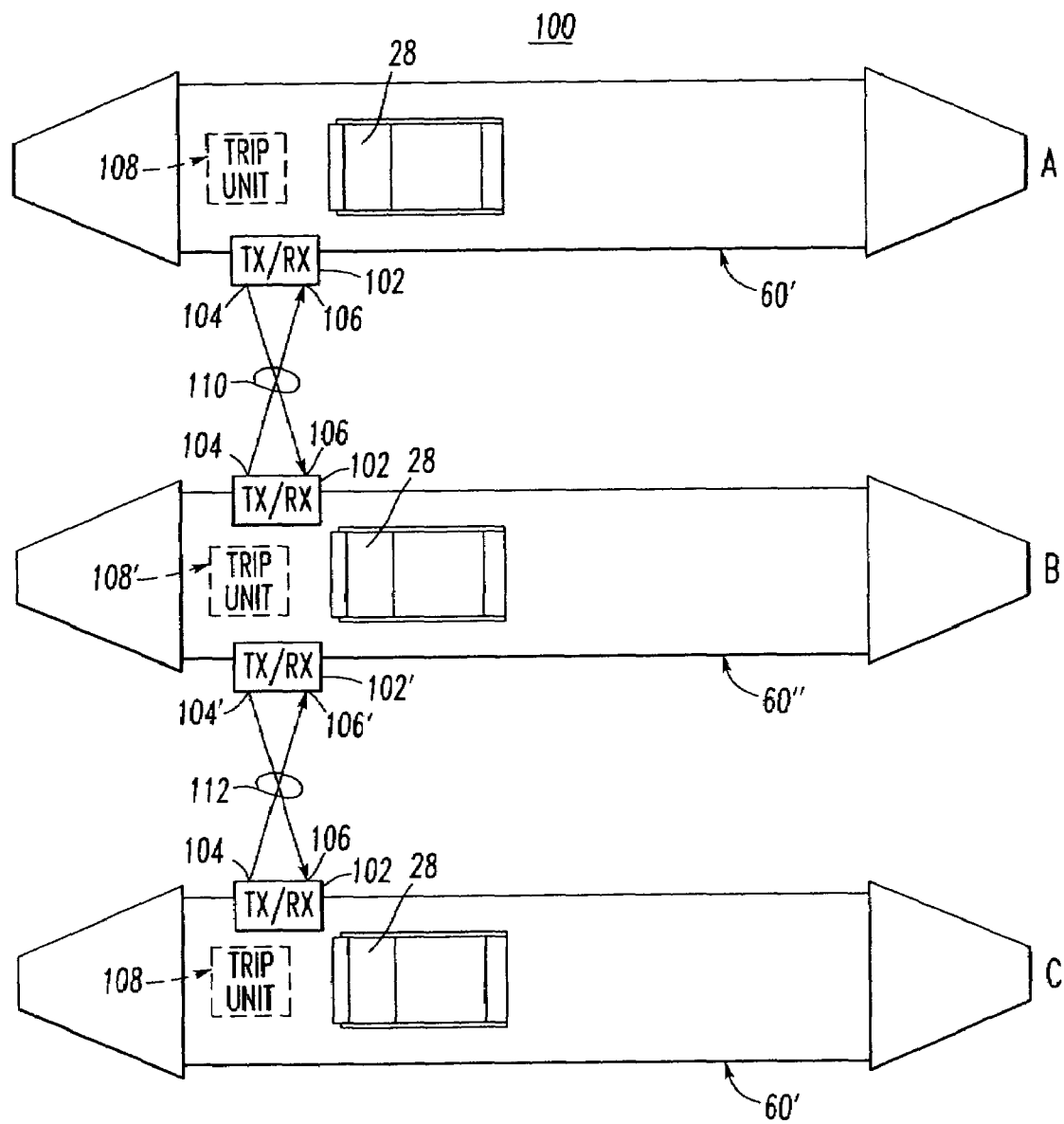
FIG. 8 is a block diagram of a three-pole medium voltage vacuum circuit interrupter formed from three of the medium voltage vacuum circuit interrupters of FIG. 4, with the three poles electrically linked in order to open, close and/or trip as one unit.

FIG. 8 shows another three-pole medium voltage vacuum circuit interrupter 100, which is formed from two single-pole medium voltage vacuum circuit interrupters 60' (poles A and C) and another single-pole medium voltage vacuum circuit interrupter 60" (pole B). The circuit interrupters 60' and 60" are similar to the circuit interrupter 60 of FIG. 4 except that respective internal trip units 108 and 108' are employed instead of the trip unit 64 of FIG. 4. The trip unit 108 includes a communication port 102 having a transmit signal 104 and a receive signal 106. The trip unit 108' includes the communication port 102 and a second communication port 102' having a transmit signal 104' and a receive signal 106'. For example, the transmit signals 104,104' output the tripped open state of the trip unit 108', and the receive signals 106,106' input external trip signals to the trip unit 108'. In this example, the two transmit signals 104,104' of the circuit interrupter 60" communicate the tripped open state of that circuit interrupter (pole B) to the receive signals 106 of the circuit interrupters 60' (poles A and C), while the two receive signals 106,106' (pole B) input the tripped open state of the transmit signals 104 from the circuit interrupters 60' (poles A and C).

In this manner, the three poles A,B,C formed by the three individual circuit interrupters 60',60",60' are electrically ganged or linked, in order to open, close and/or trip as one unit. In this example, there is a suitable first electrical linkage 110, such as a two-conductor cable, connecting the trip units 108 and 108' of the respective adjacent poles A and B, and a suitable second electrical linkage 112 connecting the trip units 108' and 108 of the respective adjacent poles B and C.

Figure 9:
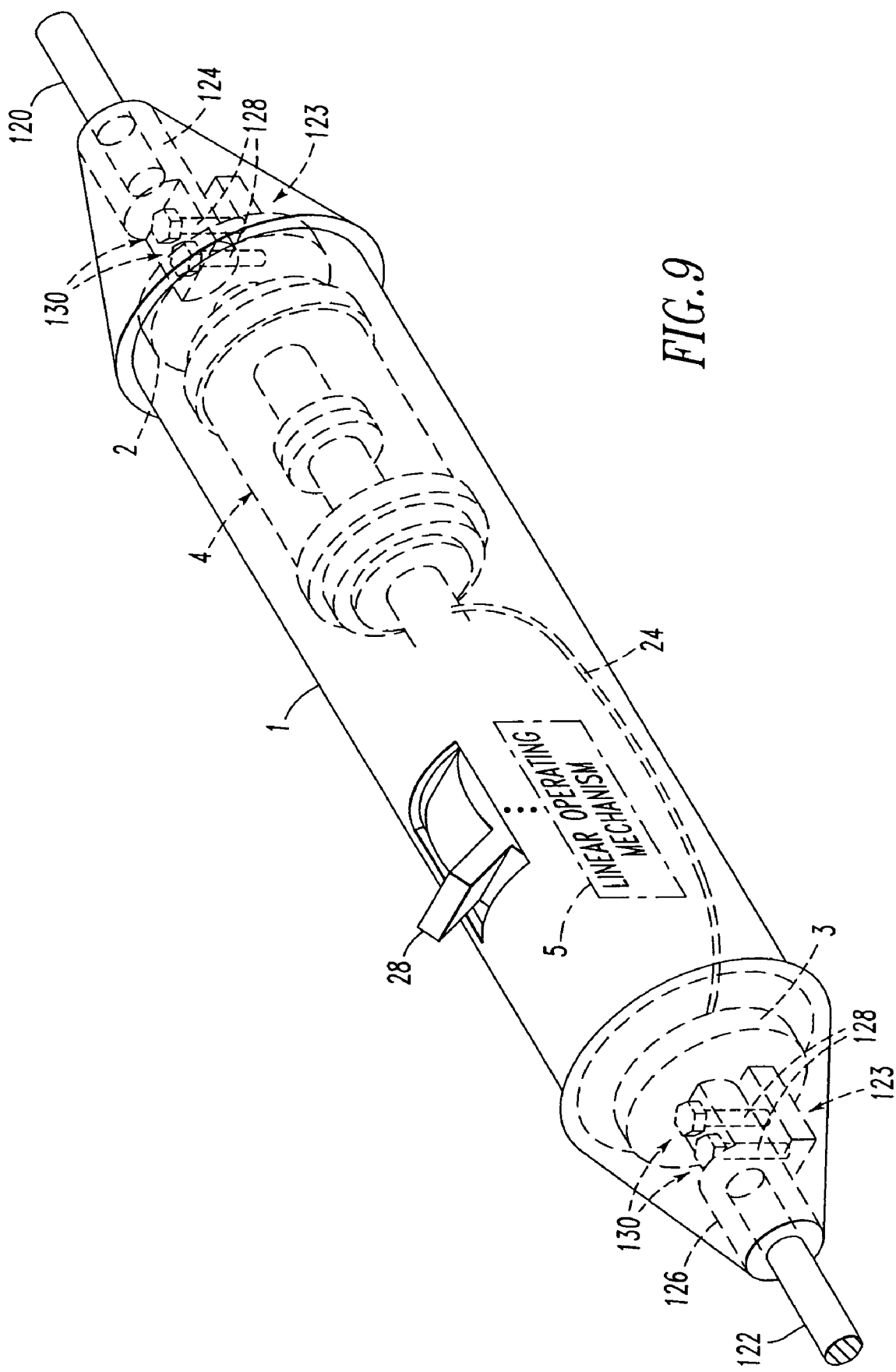
FIG. 9 is an isometric view of the medium voltage vacuum circuit interrupter of FIGS. 1 and 2 as employed in a cable-in-line mounting.

FIG. 9 shows the medium voltage vacuum circuit interrupter 1 of FIGS. 1 and 2 as employed in a cable-in-line (or cable-in/cable-out) mounting arrangement with a line power cable 120 and a load power cable 122. The line and load terminals 2,3, which include a user connection bracket portion, 123, interface to cable-in terminations 124,126 structured to electrically connect to the line and load power cables 120,122, respectively. For example, the terminations 124,126 may be compression terminals or any suitable cable connections, which are suitably fastened at openings 128 of the line and load terminals 2,3 by suitable fasteners 130 (e.g., bolts, lock washers and nuts). In this mounting arrangement, the line and load power cables 120,122 may be horizontal (as shown) or vertical (not shown), with the cables 120,122 and the cable-in terminations 124,126 providing support for the circuit interrupter 1, which need not rest upon any surface.

Figure 10:
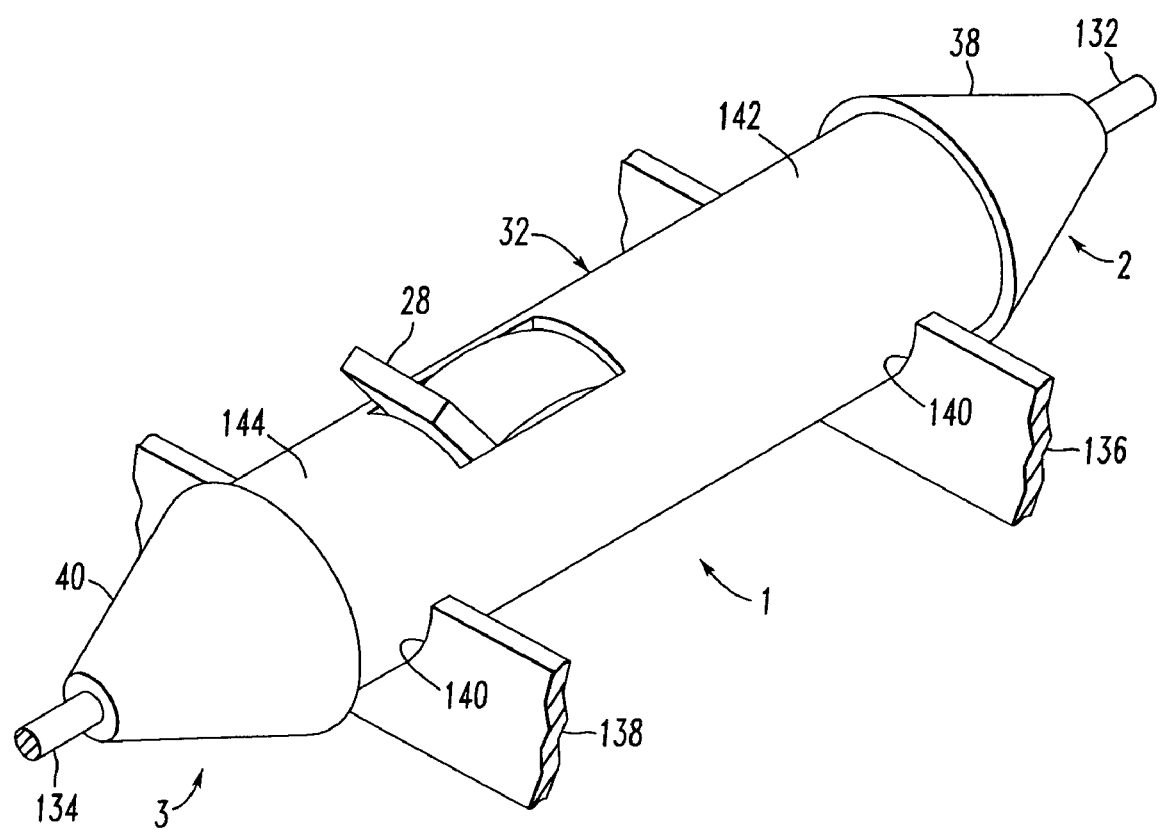
FIG. 10 is an isometric view of the medium voltage vacuum circuit interrupter of FIGS. 1 and 2 as employed in a fuse type mounting.

Referring to FIG. 10, the medium voltage vacuum circuit interrupter 1 of FIGS. 1 and 2 is employed in a fuse type mounting arrangement. Similar to the mounting arrangement of FIG. 9, a line power cable 132 and a load power cable 134 interface to the respective line and load terminals 2 and 3 by employing the user connection bracket portions 123 and fasteners 130 of FIG. 9. This mounting arrangement is similar to the cable-in-line mounting arrangement of FIG. 9 except that the circuit interrupter 1 is supported by two support members, such as mounting structures 136,138, having a semi-circular cutout 140 for the ends 142,144 of the circuit interrupter 1. As was discussed above in connection with FIGS. 1 and 2, the elongated housing 32 has a generally cylindrical shape. The first support member 136 is proximate the first housing end 142 and the second support member 138 is proximate the opposite second housing end 144. The semi-circular cutouts 140 hold the generally cylindrical shape of the circuit interrupter 1 proximate one of the first and second housing ends 142,144.

Referring again to FIG. 6, the three-pole circuit interrupter 80 is supported by corresponding support members 146,148, each of which has three semi-circular cutouts 149 for the three circuit interrupters 1. These support member cutouts 149 hold the generally cylindrical shape of the three poles formed by the three circuit interrupters 1 proximate one of the opposing ends of the elongated housings 32.

FIG. 12 shows a medium voltage vacuum circuit interrupter 150, which is similar to the circuit interrupter 50 of FIG. 3. The circuit interrupter 150 includes an elongated housing 152 with external line and load terminals 154,156, which support a flat pad mounting arrangement. The line and load terminals 154,156 include flat connection bracket portions 158,160 structured to be electrically connected (e.g., by suitable fasteners 162,164, such as bolts, lock washers and nuts) to line and load power busses 166,168, respectively. The elongated housing 152 is generally tubular shaped including a first opening 170 at the first or line end and a second opening 172 at the opposing second or load end. The line and load terminals 154,156 also include circular members 174,176, which are supported by the tubular shaped elongated housing 152 at the openings 170, 172, respectively, thereof. The flat connection bracket portions 158,160 are normal to the respective circular members 174,176. The connection bracket portions 158,160 protrude through the openings 170,172, respectively, of the elongated housing 152. In this flat pad mounting arrangement, the insulating conical end covers 38,40 of FIGS. 1 and 2 are not employed. Also, the line and load power busses 166,168 may be horizontal (as shown) or vertical (not shown), with the busses 166,168, the connection bracket portions 158,160 and the fasteners 162,164 providing support for the circuit interrupter 150, which need not rest upon any surface. Alternatively, the connection bracket portions 158,160 may be suitably fastened to cable-in terminations, such as 124, 126 of FIG. 9, with or without the conical end covers 38,40 of FIGS. 1 and 2.

The exemplary medium voltage vacuum circuit interrupters 1,50,60,70,80,90,100,150 are designed replace existing medium voltage vacuum circuit breakers and switchgear. In addition, such medium voltage vacuum circuit interrupters may replace: (1) air circuit breakers; (2) miniature circuit breakers; (3) fuse switches and/or fuse breakers (see, e.g., U.S. Pat. No. 4,077,026); (4) other switching devices; (5) other circuit breakers; and (6) mechanism devices.

The disclosed medium voltage vacuum circuit interrupters 1,50,60,70,80,90,100,150 allow for the elimination of traditional switchgear and may be mounted underground and, therefore, do not require traditional steel housings above ground.

The exemplary medium voltage vacuum circuit interrupters 1,50,60,70,80,90,100,150 may employ a wide range of mounting configurations and/or terminations. For example, the following non-limiting types of mountings may be employed: horizontal; vertical; fuse holder type mountings; retrofit fuse holder type mountings; retrofit breaker mountings; and underground mountings (e.g., in close proximity (or far phase spacing); bracket mounted; switch mounted; fastened; attached; and non-interface mounted).

The exemplary elongated, generally cylindrical housings 32,54,68,74,152 for the disclosed medium voltage vacuum circuit interrupters preferably employ a relatively very small, short, narrow design.

The exemplary medium voltage vacuum circuit interrupters 1,60,70,90,100 may include a trip unit, such as 64 or 108, which senses the condition of the protected circuit and trips open the circuit interrupter via a suitable trip actuator or trip latch. The trip unit 64 may preferably be accessed via a wireless (e.g., infrared) connection and, therefore, does not employ conventional switchgear mounting and/or physical access from one pole to another in a multi-pole configuration.

Although circuit interrupters having one or three poles have been disclosed, the present invention is applicable to a wide range of circuit interrupters having one, two, three or more poles.

As discussed above in connection with FIGS. 1 and 2, the medium voltage vacuum circuit interrupter 1 may be assembled with all internal components preferably encapsulated by a suitable insulator (e.g., molded rubber) and/or an insulated housing. Therefore, the complete assembly is encapsulated. This allows for components that would, otherwise, be damaged by high voltage spikes to remain protected. This also allows the medium voltage vacuum circuit interrupter 1 to be relatively extremely small and compact.

The operating mechanisms, such as 5,52 or 52', may be, for example, a conventional spring-powered operating mechanism, a linear operating mechanism or a linear actuator.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A medium voltage vacuum circuit interrupter comprising:
    a first terminal;
    a second terminal;
    a vacuum switch comprising a vacuum envelope containing a fixed contact assembly and a movable contact assembly movable between a closed circuit position in electrical communication with the fixed contact assembly and an open circuit position spaced apart from the fixed contact assembly, said fixed contact assembly electrically interconnected with said first terminal;
    a flexible conductor electrically connecting said movable contact assembly with said second terminal;
    an operating mechanism moving said movable contact assembly between the closed circuit position and the open circuit position;
    an elongated housing including a first end supporting said first terminal and an opposite second end supporting said second terminal, said housing enclosing said vacuum switch, said flexible conductor and said operating mechanism;
    wherein said operating mechanism includes a current sensor sensing current passing between said movable contact assembly and said second terminal, and a trip unit responsive to said sensed current to move said movable contact assembly from the closed circuit position to the open circuit position; and
    wherein said elongated housing has an opening; and wherein said trip unit includes a wireless communication port, which protrudes through the opening of said housing.

2. A medium voltage vacuum circuit interrupter comprising:
    a first terminal;
    a second terminal;
    a vacuum switch comprising a vacuum envelope containing a fixed contact assembly and a movable contact assembly movable between a closed circuit position in electrical communication with the fixed contact assembly and an open circuit position spaced apart from the fixed contact assembly, said fixed contact assembly electrically interconnected with said first terminal;
    a flexible conductor electrically connecting said movable contact assembly with said second terminal;
    an operating mechanism moving said movable contact assembly between the closed circuit position and the open circuit position;
    an elongated housing including a first end supporting said first terminal and an opposite second end supporting said second terminal, said housing enclosing said vacuum switch, said flexible conductor and said operating mechanism; and
    wherein said elongated housing is generally tubular shaped including a first opening at the first end and a second opening at the second end; and wherein said first and second terminals include a first member, which is supported by said generally tubular shaped elongated housing at one of the first and second openings thereof, and a second member, which is normal to said first member.

3. The medium voltage vacuum circuit interrupter of claim 2 wherein each of said first and second terminals is structured to electrically connect to a line power cable or a load power cable.

4. A multi-pole medium voltage vacuum circuit interrupter comprising:
    a plurality of circuit interrupter poles, each of said circuit interrupter poles comprising:
    a first terminal;
    a second terminal;
    a vacuum switch comprising a vacuum envelope containing a fixed contact assembly and a movable contact assembly movable between a closed circuit position in electrical communication with the fixed contact assembly and an open circuit position spaced apart from the fixed contact assembly, said fixed contact assembly electrically interconnected with said first terminal;
    a flexible conductor electrically connecting said movable contact assembly with said second terminal;

an operating mechanism moving said movable contact assembly between the closed circuit position and the open circuit position;

an elongated housing including a first end supporting said first terminal and an opposite second end supporting said second terminal, said housing enclosing said vacuum switch, said flexible conductor and said operating mechanism;

means for linking said operating mechanism to another operating mechanism of another one of said circuit interrupter poles;

wherein said operating mechanism includes a current sensor sensing current passing between said movable contact assembly and said second terminal, and a trip unit responsive to said sensed current to move said movable contact assembly from the closed circuit position to the open circuit position; and wherein said means for linking includes an electrical cable connecting said trip unit to another trip unit of another one of said circuit interrupter poles.

5. A multi-pole medium voltage vacuum circuit interrupter comprising:

a plurality of circuit interrupter poles, each of said circuit interrupter poles comprising:

a first terminal;

a second terminal;

a vacuum switch comprising a vacuum envelope containing a fixed contact assembly and a movable contact assembly movable between a closed circuit position in electrical communication with the fixed contact assembly and an open circuit position spaced apart from the fixed contact assembly, said fixed contact assembly electrically interconnected with said first terminal;

a flexible conductor electrically connecting said movable contact assembly with said second terminal;

an operating mechanism moving said movable contact assembly between the closed circuit position and the open circuit position;

an elongated housing including a first end supporting said first terminal and an opposite second end supporting said second terminal, said housing enclosing said vacuum switch, said flexible conductor and said operating mechanism;

means for linking said operating mechanism to another operating mechanism of another one of said circuit interrupter poles;

wherein said operating mechanism includes a current sensor sensing current passing between said movable contact assembly and said second terminal, and a trip unit responsive to said sensed current to move said movable contact assembly from the closed circuit position to the open circuit position; and wherein said means for linking includes an infrared transceiver connecting said trip unit to another trip unit of another one of said circuit interrupter poles.

6. A multi-pole medium voltage vacuum circuit interrupter comprising:

a plurality of circuit interrupter poles, each of said circuit interrupter poles comprising:

a first terminal;

a second terminal;

a vacuum switch comprising a vacuum envelope containing a fixed contact assembly and a movable contact assembly movable between a closed circuit position in electrical communication with the fixed contact assembly and an open circuit position spaced apart from the fixed contact assembly, said fixed contact assembly electrically interconnected with said first terminal;

a flexible conductor electrically connecting said movable contact assembly with said second terminal;

an operating mechanism moving said movable contact assembly between the closed circuit position and the open circuit position;

an elongated housing including a first end supporting said first terminal and an opposite second end supporting said second terminal, said housing enclosing said vacuum switch, said flexible conductor and said operating mechanism; and wherein said elongated housing has a generally cylindrical shape; and wherein said elongated housing of one of said circuit interrupter poles includes a first support member proximate the first end of said elongated housing and a second support member proximate the opposite second end of said elongated housing, with each of said first and second support members including a first cutout to hold the generally cylindrical shape of said one of said circuit interrupter poles proximate one of the first and second ends of said elongated housing, and with each of said first and second support members further including at least one second cutout to bold the generally cylindrical shape of at least another one of said circuit interrupter poles proximate one of the first and second ends of said elongated housing.

* * * * *